United States Patent [19]

Plumer

[11] Patent Number: 4,872,256
[45] Date of Patent: Oct. 10, 1989

[54] PROCESS FOR PRODUCING A SQUIRREL-CAGE ROTOR

[75] Inventor: Louis Plumer, Cluses, France

[73] Assignee: Somfy, Cluses, France

[21] Appl. No.: 246,256

[22] Filed: Sep. 19, 1988

[30] Foreign Application Priority Data

Oct. 2, 1987 [FR] France ............................. 87 13655

[51] Int. Cl.⁴ ........................................... H02K 15/02
[52] U.S. Cl. ...................................... 29/598; 310/211; 310/212; 310/77
[58] Field of Search .................. 29/598; 310/211, 212, 310/77

[56] References Cited

U.S. PATENT DOCUMENTS

| | | | |
|---|---|---|---|
| 3,965,380 | 6/1976 | Stepina | 310/211 |
| 4,445,272 | 5/1984 | Bruhn et al. | 29/598 |
| 4,720,647 | 1/1988 | Plumer | 310/211 |
| 4,738,620 | 4/1988 | Neuenschwander | 29/598 |

OTHER PUBLICATIONS

Iguchi, Nobuaki, "Progressive Lamination Die with Automatic Stacking Device (Fastec ® System)" in *International Forum '85 on Die and Mold*, pp. 1–12.

*Primary Examiner*—P. W. Echols
*Assistant Examiner*—K. Jordan
*Attorney, Agent, or Firm*—Laff, Whitesel, Conte & Saret

[57] ABSTRACT

The object of the process is to obtain an intermediate short-circuiting ring in a squirrel cage rotor by filling. It makes use of the technique consisting in automatically cutting out and assembling rotor laminations by means of a follow-on machine in which the laminations are cut out from a strip, rotated through a determined angle and provided with half-cutouts for their assembly in a packet. The process consists in eliminating at least one tooth in every two from the laminations whose position in the packet corresponds to the situation of the intermediate short-circuiting ring, and turning these laminations through an angle such that when filling is effected a continuous annular zone of nonmagnetic material is obtained.

2 Claims, 4 Drawing Sheets

PROCESS FOR PRODUCING A SQUIRREL-CAGE ROTOR

FIELD OF THE INVENTION

The present invention relates to a process for producing a squirrel-cage rotor for an induction motor, whereby packets of laminations are made by the method consisting in automatically cutting out and assembling rotor laminations of magnetic material by means of a follow-on machine in which the laminations are cut from a strip by means of selectable punches, rotated through a determined angle and provided with half-cutouts, and thereupon assembled in packets by means of the half-cutouts, the angle of rotation having the effect of forming helicoidal slots on the packet of laminations, and the packets of laminations are filled with a nonmagnetic conductive material.

PRIOR ART

This method, known by the name FASTEC (registered trade mark) process, is described in detail in the publication "Progressive Lamination Die with Automatic Stacking Device" (FASTEC® System) of NOBUAKI IGUCHI, International Forum '85 on Die and Mold. This process and the machine for its application make it possible to produce squirrel-cage rotors in a particularly rational way. The follow-on machine is equipped with a control station enabling certain punches to be used preferentially and enabling the assembly matrix to be turned through the desired angle synchronously with each stroke of the press. This process, which has the advantage of being completely automatic and of supplying packets of laminations which can be directly filled, nevertheless does not make it possible to produce rotors provided with an intermediate short-circuiting ring, such as for example that described in the document FR-A No. 2 562 348. Up to the present time the laminations of rotors of this kind, having intermediate short-circuiting rings, had to be assembled manually. The laminations cut out are first stacked, the space required for the intermediate short-circuiting ring being obtained by inserting in the stack some special laminations, generally three in number, whose outside diameter is smaller, whereupon the helix is formed manually with the aid of piano strings inserted into the slots. A provisional shaft is then driven into the packet of laminations in order to hold the latter to enable the filling operation to be carried out. The provisional shaft is then removed and replaced with a definitive shaft. A manual method of this kind is lengthy, tedious and expensive. The automation of a manual method of this kind by means of the FASTEC method is scarcely of interest, because it would lead to the punching out from the same strip, between the rotor laminations, of laminations of a smaller outside diameter, which is obviously not possible without some additional, detrimental expedient, such as the resetting in strip, for example.

The present invention seeks precisely to produce by the FASTEC method a packet of laminations provided with the space necessary for obtaining an intermediate short-circuiting ring by the filling operation.

SUMMARY OF THE INVENTION

The process according to the invention is characterized in that at least one tooth in every two is removed from the laminations whose position in the packet corresponds to the desired situation of the intermediate short-circuiting ring and the laminations cut out are turned through an angle corresponding to a whole number of teeth plus the angle of the desired helix, this whole number being different from the number of teeth of a lamination having a complete toothing and from a multiple thereof, and different from the number of teeth eliminated between two consecutive teeth and a multiple thereof, in such a manner that when filling is effected a continuous annular zone of nonmagnetic material is obtained.

A particularly interesting embodiment of the process according to the invention consists in retaining only three teeth distributed at least approximately regularly, and turning the laminations through the angle corresponding to one or two teeth plus the angle of the helix. Three teeth are in fact sufficient to keep these laminations centered during the formation of the packet, while there is the minimum of iron in the intermediate short-circuiting ring.

BRIEF DESCRIPTION OF THE DRAWINGS

The accompanying drawing shows some forms of construction of the rotor obtained by the process according to the invention.

DESCRIPTION OF THE PREFERRED EMBODIMENTS

Figure 1:
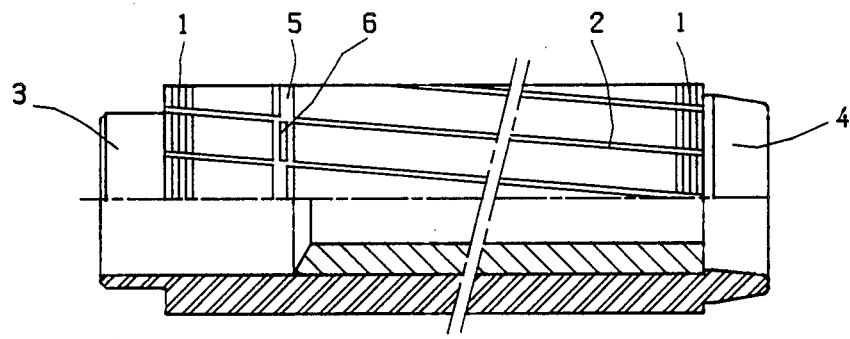
FIG. 1 shows the squirrel-cage rotor and the intermediate short-circuiting ring that it is desired to obtain.

In the rotor shown in FIG. 1 it is possible to recognize the packets of laminations 1, of which only a few have been shown at each end of the rotor, the slots 2 filled with a nonmagnetic conductive material, for example aluminum, the short-circuiting rings 3 and 4 at each end of the rotor, and an intermediate short-circuiting ring 5. A dotted line 6 shows the teeth or pole shoes of the laminations according to FIGS. 6 and 7, which will be discussed later on.

Figure 2:
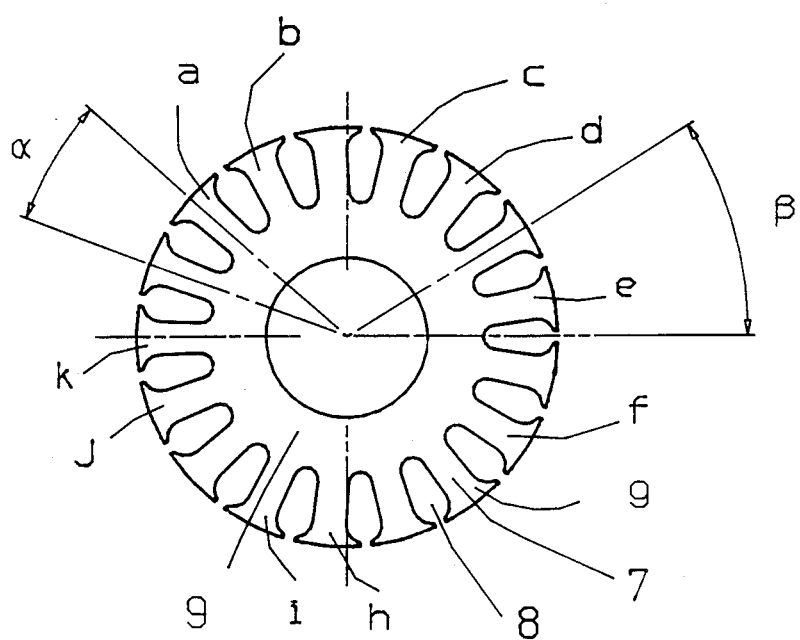
FIG. 2 shows a normal lamination of the rotor of FIG. 1.

One of the laminations 1 is shown in FIG. 2. This lamination has seventeen teeth 7 defining seventeen tooth spaces 8 intended to form the rotor slots and surrounding an inner portion 9 intended to form the yoke of the rotor.

Figure 3:
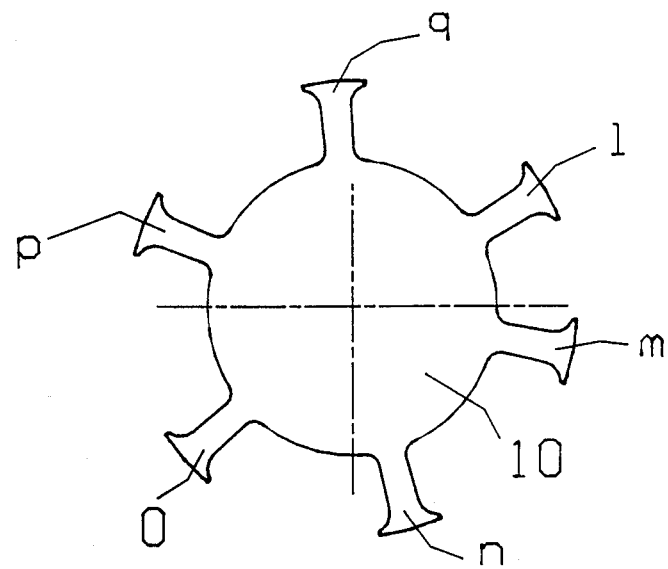
FIG. 3 shows a lamination intended to occupy the site of the intermediate short-circuiting ring.
Figure 4:
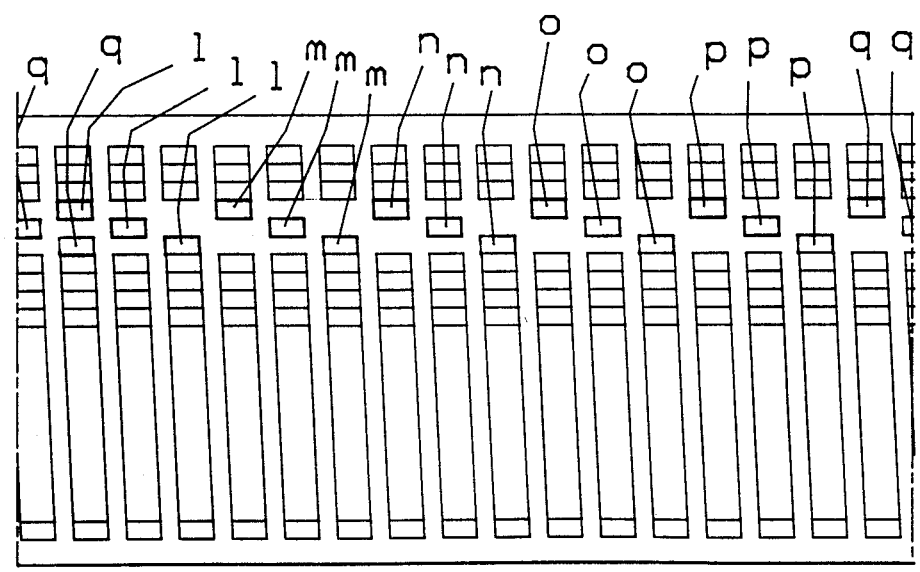
FIG. 4 is a developed view of the rotor provided with laminations according to FIGS. 2 and 3, which are rotated in accordance with a first angle.

FIG. 3 shows a lamination intended to define the space intended for the intermediate short-circuiting ring. This lamination corresponds to a lamination according to FIG. 2, in which the teeth a, b, c, d, e, f, g, h, i, j and k have been eliminated, that is to say two teeth out of three except between the teeth l and m, taking into account the odd number of teeth. The teeth are removed by operating an ad hoc punch after a number of press strokes corresponding to the desired position of the short-circuiting ring, and during a number of press strokes corresponding to the thickness of the desired short-circuiting ring. In the case of FIG. 4 the teeth are removed from three successive laminations.

Figure 5:
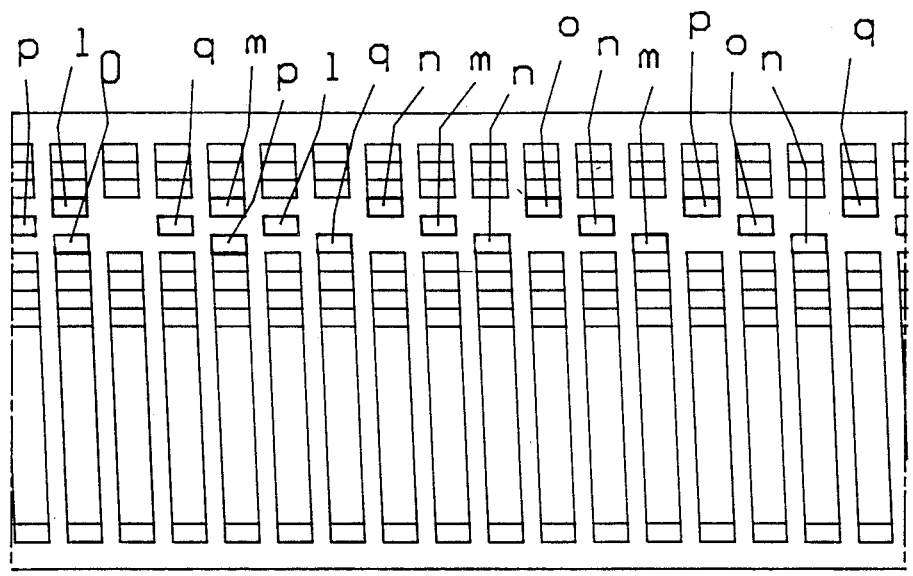
FIG. 5 shows a developed view of a rotor formed with the aid of laminations according to FIGS. 2 and 3, which are rotated in accordance with a second angle.

In the follow-on machine all the laminations, after having been cut out, are deposited in an assembly matrix and rotated step-by-step synchronously with each press stroke, so as to offset the laminations angularly in relation to one another. In the example illustrated in FIG. 4, this angle of rotation corresponds to the step between two teeth, that is to say to the angle (FIG. 2) plus the angle of the helix which it is desired to obtain. In the space 5 corresponding to the intermediate short-circuiting ring the teeth of the laminations according to FIG. 3 are thus offset relative to one another by the value of one tooth with one exception. During filling with the nonmagnetic conductive material continuity of material is thus obtained in the space 5 to ensure good electrical conductivity, that is to say an intermediate short-circuiting ring. It is obvious that the laminations must be rotated in such a manner that the teeth of the laminations according to FIG. 3 are offset. This is the case if the laminations are turned by a number of teeth different from seventeen or a multiple thereof, and different from the number of teeth removed between two consecutive teeth and from a multiple thereof. It is thus possible to turn the laminations of the rotor, and in particular the laminations according to FIG. 3, through an angle corresponding to more than one tooth. FIG. 5 shows by way of example a rotor obtained by turning the laminations through an angle corresponding to four teeth, that is to say four times α plus the angle of the helix. It will be seen that this rotor has the same appearance as the rotor shown in FIG. 4.

Figure 6:
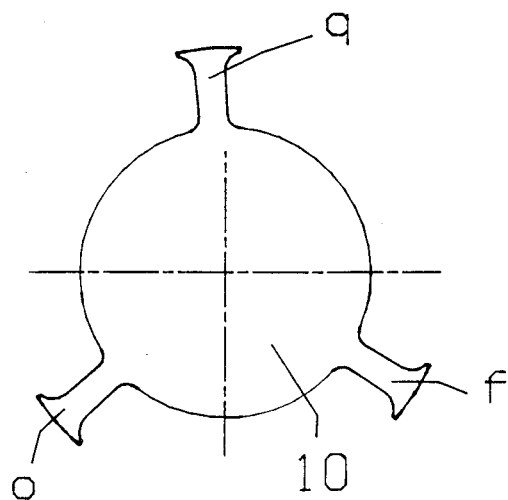
FIG. 6 shows a second form of construction of a lamination intended to occupy the site of the intermediate short-circuiting ring.
Figure 7:
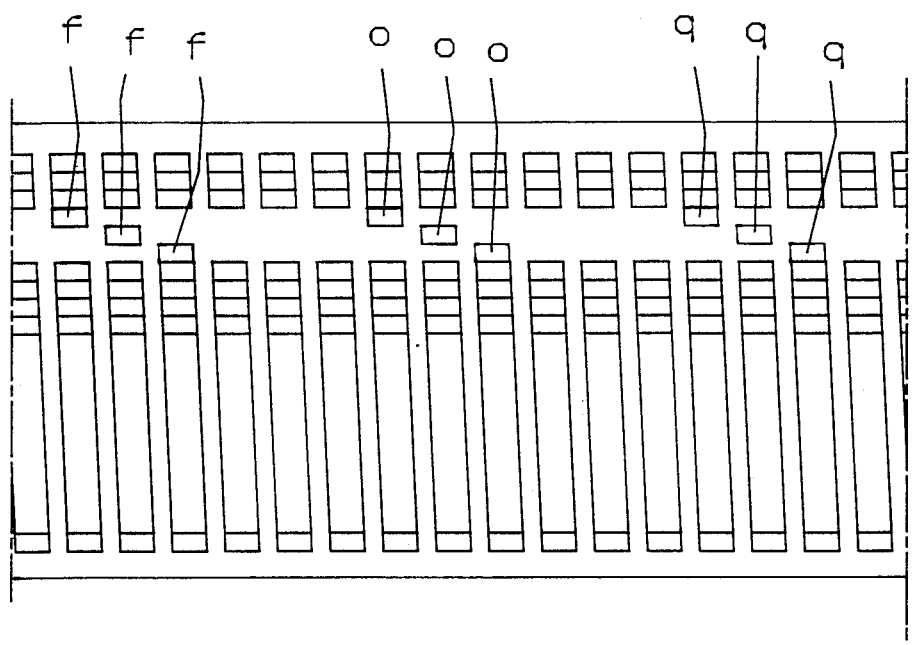
FIG. 7 is a developed view of a rotor formed with laminations according to FIGS. 2 and 6.

FIGS. 6 and 7 show by way of example a second embodiment. The laminations intended to occupy the space reserved for the intermediate short-circuiting ring now have only three teeth f, o and q, using once again the references used in FIGS. 2 and 3. These three teeth are distributed approximately regularly over the circumference in such a manner that they center the lamination in the assembly matrix and during stacking. The space reserved for the intermediate short-circuiting ring is once again obtained by means of three laminations.

The laminations are rotated through an angle β, that is to say one slot pitch plus the angle of the desired helix. The amount of iron in the intermediate short-circuiting ring 5 is reduced to the minimum.

Starting with a lamination according to FIG. 2, it would also be possible to retain four or eight teeth for the laminations intended to form the space for the intermediate short-circuiting ring.

After filling, the interior of the rotor is machined to remove the crown 10 connecting the teeth of the laminations situated in the intermediate short-circuiting ring 5, so as to leave only this intermediate ring.

I claim:

1. A process for producing a squirrel-cage rotor for an induction motor, whereby packets of laminations are made by the method consisting in automatically cutting out and assembling rotor laminations of magnetic material by means of a follow-on machine in which the laminations are cut from a strip by means of selectable punches, rotated through a determined angle and provided with half-cutouts, and thereupon assembled in packets by means of the half-cutouts, the angle of rotation having the effect of forming helicoidal slots on the packet of laminations, and the packets of laminations are filled with a nonmagnetic conductive material, in which process in order to obtain an intermediate short-circuiting ring, removing teeth in an ordered manner from the laminations whose position in the packet corresponds to the desired situation of the intermediate short-circuiting ring, and the laminations cut out are turned through an angle corresponding to a whole number of teeth plus the angle of the desired helix, this whole number being different from the number of teeth of a lamination having a complete toothing and from a multiple thereof, and said removal being such that step-by-step rotations will result in a clear flow path around a short circuiting section for the non-magnetic material filler, and in such a manner that when filling is effected a continuous annular zone of nonmagnetic material is obtained.

2. A process as claimed in claim 1, wherein only three teeth are left on the laminations occupying the site of the desired intermediate short-circuiting ring.

* * * * *